June 14, 1949.    R. F. HAYS, JR    2,472,824
RADIO SCANNING APPARATUS

Filed June 16, 1945    3 Sheets-Sheet 1

INVENTOR
ROBERT F. HAYS, JR.
BY
Herbert H. Thompson
his ATTORNEY.

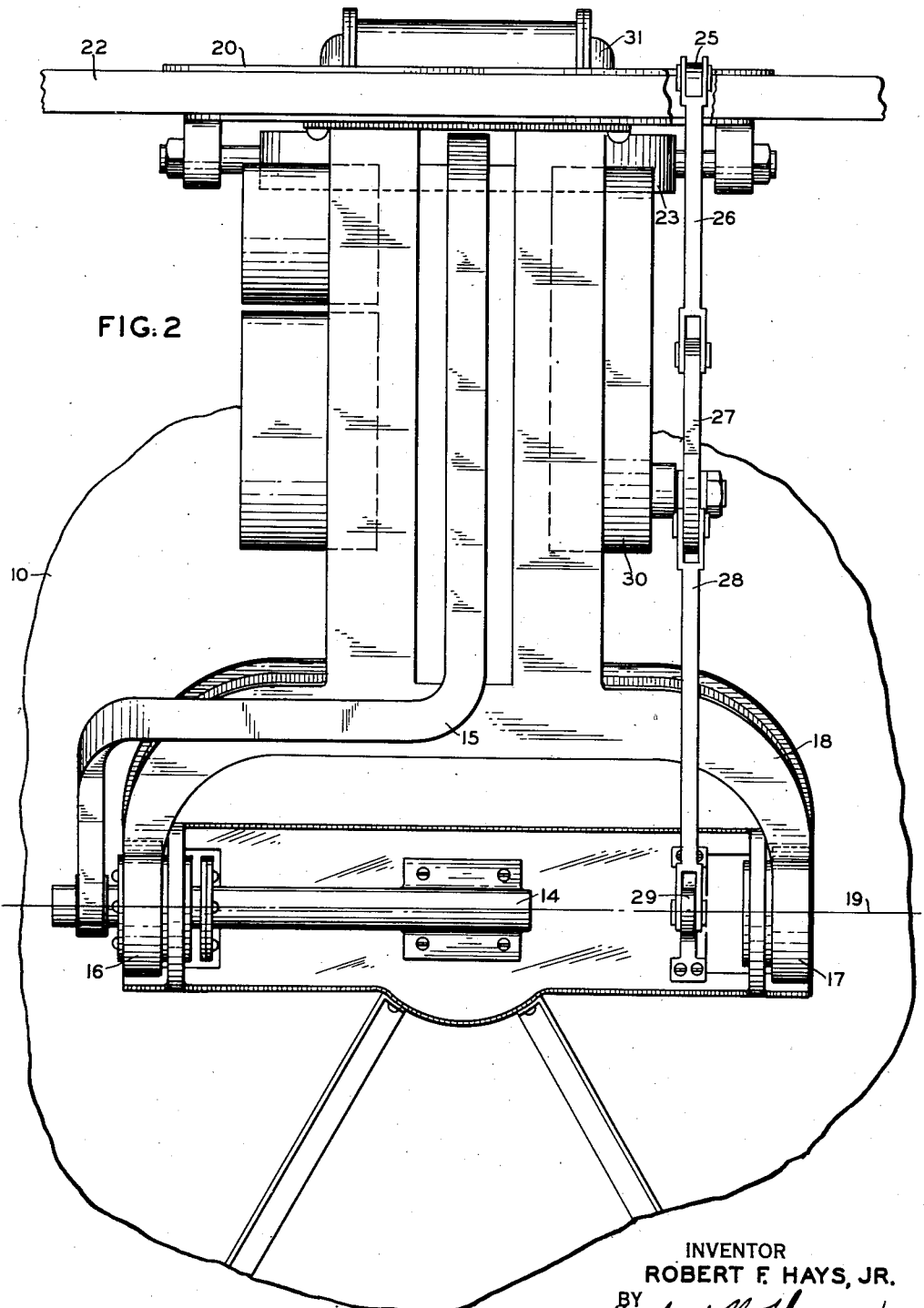

June 14, 1949.  R. F. HAYS, JR  2,472,824
RADIO SCANNING APPARATUS
Filed June 16, 1945  3 Sheets-Sheet 3
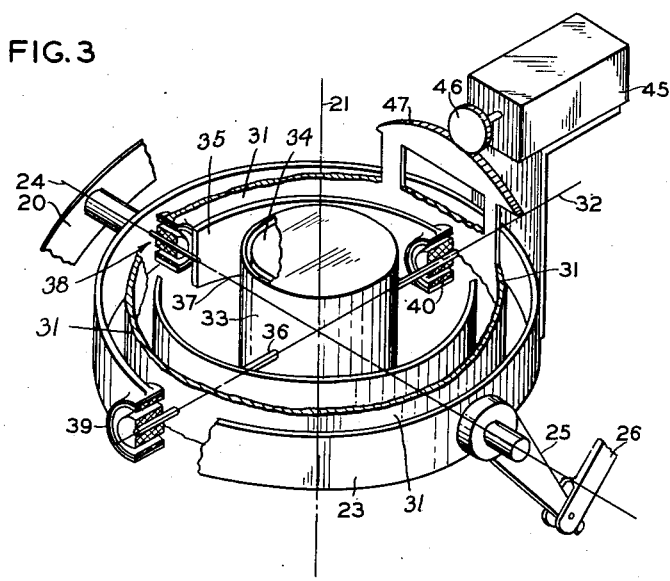
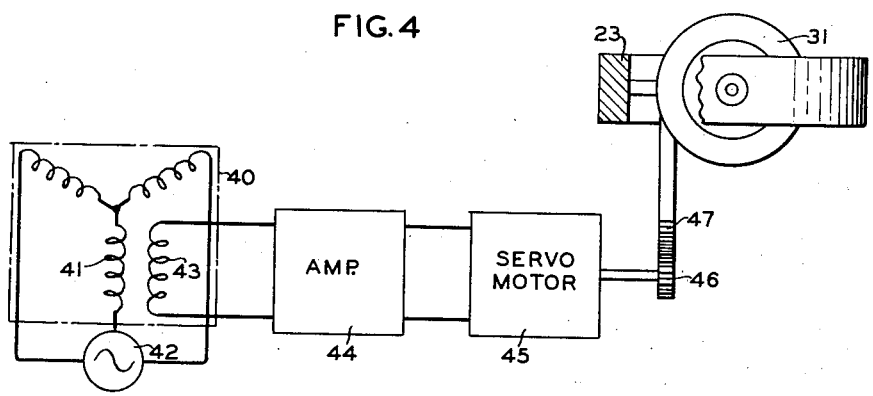
INVENTOR
ROBERT F. HAYS, JR.
BY *Herbert N. Thompson*
his ATTORNEY Patented June 14, 1949

2,472,824

UNITED STATES PATENT OFFICE 2,472,824

RADIO SCANNING APPARATUS

Robert F. Hays, Jr., Syosset, N. Y., assignor to The Sperry Corporation, a corporation of Delaware Application June 16, 1945, Serial No. 599,855

11 Claims. (Cl. 250—33.65)

This invention relates to an improvement in radio scanning apparatus of the character shown and described in Letters Patent 2,407,275, issued September 10, 1946, to the present inventor.

In my improved instrument, the casing of the stabilizing gyro vertical is pivotally mounted on the frame of a directional antenna by means of an external gimbal to obtain a correct measurement of tilt of the antenna about the normally horizontal axis thereof that is perpendicular to its nod axis. The nod axis of the antenna is normally horizontal and is herein termed its pitch axis. The other of the axes of the antenna is consequently referred to as the roll axis. Heretofore in apparatus of this character with the antenna inclined about its pitch or nod axis from a horizontal position, measurement of the tilt of the antenna from a normal position about its roll axis included an error component due to the fact that the roll axis was inclined to the horizontal. This objection has been overcome in the improved instrument.

A further feature of the invention resides in the servo means provided to maintain zero angular displacement between the rotor case of the gyro vertical and the casing thereof about the normally coincident axes thereof.

Another feature of the invention resides in the provision of a parallel motion connection between the horizontal axis of the gimbal on which the casing of the gyro vertical is mounted and the nod axis of the directive antenna.

In the improved instrument, rotation or oscillation of the scanner does not cause precession of the gyro instrument regardless of whether the azimuth axis of the scanner is vertical or inclined. With the external gimbal support for the gyro casing, the casing is mounted to always move about the spin axis of the gyro and not about the azimuth axis of the scanner. In the present instance, two servos operate to keep the gyro casing properly positioned relatively to the spin axis of the gyro vertical.

Other features and structural details of the invention will be apparent from the following description when read in relation to the accompanying drawings, wherein Fig. 1 is a side elevation of an apparatus constructed in accordance with the present invention;

Fig. 2 is a rear elevation of the apparatus shown in Fig. 1;

Fig. 3 is a detail bottom schematic view of the gyro vertical, the gimbal mounting thereof and its servo motor in perspective; and Fig. 4 is a schematic view and circuit diagram showing the servo system of the improved instrument by which the casing of the gyro vertical is positioned.

Figure 1:
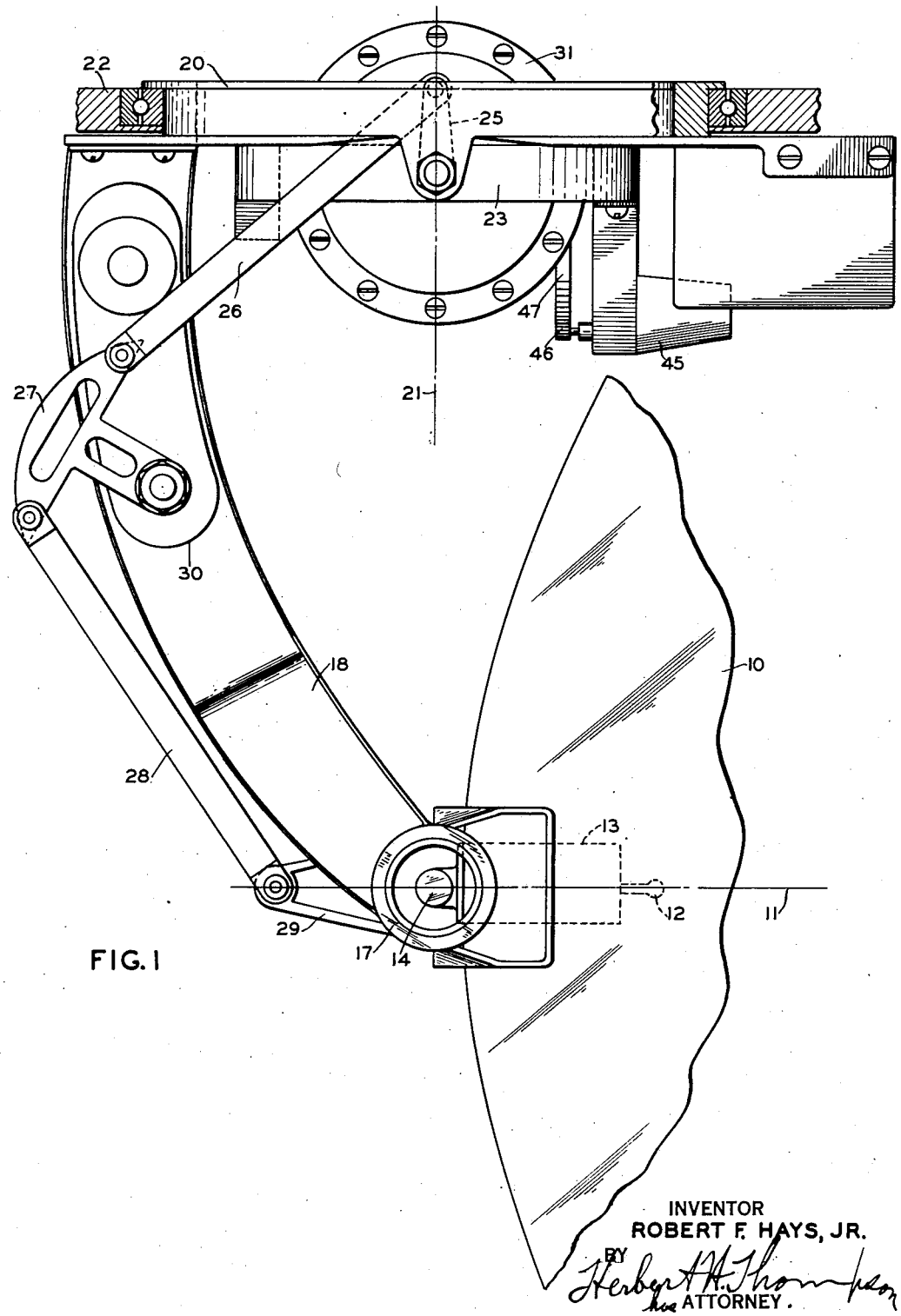

As shown in Fig. 1 of the drawing, the improved radio scanning apparatus includes an antenna for transmitting or receiving ultra high frequency waves of electromagnetic energy. The representative antenna illustrated includes a reflector 10 which in this instance is paraboloid in shape. Axis 11 of the reflector 10 defines the hereinbefore termed roll or directive axis of the scanning apparatus. The antenna proper may be provided by a dipole type of electromagnetic energy radiator 12 supplied with energy by way of rectangular wave guide 13, coaxial line 14 and wave guide 15. The last two of the noted elements are clearly shown in Fig. 2 of the drawings of the application.

The antenna of the radio scanner is mounted by means of spaced bearings 16 and 17 to a yoke 18, the same moving about a horizontal or nod axis as indicated at 19. As shown in Fig. 1, yoke 18 is suitably fixed to a turntable 20 that is capable of revolving about a vertical axis 21. Axis 21 of the apparatus is hereinafter termed the spin axis of the antenna. The yoke and turntable together form a frame that is mounted in the base or bottom 22 of the craft or body on which the apparatus is employed. Yoke 18 extends below the base 22 of the craft so that the reflector 10 may be free to spin about axis 21 and nod or pitch about axis 19 without interference. As the motive means for spinning the antenna about axis 21 forms no part of the present invention, the same is not represented in the drawing.

In accordance with the teaching of the invention, turntable 20 provides a pivotal mounting for a gimbal 23 whose axis 24, Fig. 3, is so arranged as to be parallel to the horizontal pitch axis 19 of the antenna. Parallel motion means connect the gimbal 23 and the antenna about the respective parallel axes thereof. As particularly shown in Fig. 1, such means may include a linkage mechanism consisting of crank 25, link 26, bell crank 27, link 28 and arm 29 one end of which is fixed to the reflector 10. Crank 25 may be fixedly mounted on one of the trunnions of the gimbal 23 so that the same moves with movement of the gimbal about axis 24. As shown in Fig. 2, bell crank 27 is pivotally mounted on yoke 18 and is capable of being driven by a servomotor whose housing 30 is fixedly mounted on the yoke 18.

The gyro vertical of the instrument includes a housing or casing 31 that is pivotally mounted on gimbal 23 by means of suitable trunnions to move about an axis normal to the axis of the gimbal. This normally horizontal axis of the casing of the gyro vertical is indicated at 32. With particular reference to Fig. 3, the gyro instrument shown includes a universally mounted rotor bearing case 33 with a rotor 34 therein that is spun by suitable means (not shown) about a vertical axis. The spin axis of the gyro rotor as shown is normally vertical and coincident with the azimuth axis 21 about which the scanner may rotate or oscillate. In the gyro vertical, the rotor case is universally supported for movement about two mutually perpendicular normally horizontal axes by means of a second gimbal 35. As shown in Fig. 3, the minor axis 36 of the case 33 is normally coincident with the axis 32 of the casing 31. The major axis 37 of the rotor case of the gyro vertical is shown as normally coincident with the axis 24 of the gimbal 23. Axes 36—37 and 24—23 intersect at the vertical or spin axis of the antenna to obviate the effect of centrifugal force on the gyro vertical due to spinning motion of the antenna.

It will be understood that suitable erecting means (not shown) are employed with the gyro vertical to maintain the rotor case 33 thereof free of tilt about the axes 36 and 37.

The control circuit for the antenna positioning servo motor as shown in detail in Patent 2,407,275 includes a suitable pickoff indicated generally at 38 in Fig. 3. Pickoff 38, as shown, is a "selsyn" instrument that produces a voltage signal whose phase sense and magnitude are determined by the direction and extent of angular displacement of the rotor case and gyro casing from a normal position about the major axis 37 thereof. Pickoff 38 in Fig. 3 of this case corresponds to the pickoff 34' shown in Figs. 7 and 8 of Patent 2,407,275. The present disclosure differs from that of the noted application in that two pickoffs as indicated at 39 and 40 are employed about normally coincident axes 32 and 36. Both of these pickoffs are shown as "selsyn" instruments and pickoff 39, the one included in the control circuit, measures angular displacement between the gyro vertical casing 31 and the external gimbal 23.

In accordance with the teaching of the present invention, pickoff 40 which measures tilt of the rotor case about the minor axis 36 forms a part of a servo motor circuit that restores the gyro housing or casing 31 to a tilt free condition about the axis thereof normally coincident with the axis 36 of the rotor case. Fig. 4 of the drawing shows an input winding 41 of pickoff 40 fed by a suitable alternating current source 42 of electrical energy. The relatively movable output winding 43 of the pickoff is shown as feeding a suitable amplifier indicated generally at 44 that in turn energizes servomotor 45. As shown in the drawing, the housing of servo-motor 45 is fixedly mounted on the external gimbal 23. Servomotor 45 further drives a gear 46 that meshes with a sector gear 47 included on the casing 31 of the gyro vertical. The described servo means is responsive to the output of the pickoff 40 to move the casing of the gyro vertical so that the same is restored to a tilt free condition about axis 36.

In the improved instrument with the antenna tilted about its pitch axis so that its roll or directive axis is not horizontal, axis 36 of the gyro vertical remains horizontal and the casing 31 is maintained by the servo means described to provide an accurate base for measuring displacement of the antenna about the directive axis thereof even with axis 32 correspondingly inclined. Pickoff 39 corresponds to pickoff 44 shown in Figs. 7 and 8 of Patent 2,407,275.

Relative to the control of the scanner about its pitch axis 19, the servo means in housing 30 in this instance is responsive to the output of pickoff 38 to move the gimbal 23 and casing of the gyro vertical together through bell crank 27, link 26 and crank 25 in a direction that restores the casing of the instrument to a tilt free condition about axis 37. The part of the parallel linkage connection to the bell crank 27 consisting of link 28 and arm 29 provides a means for correspondingly moving the antenna of the apparatus about nod axis 19.

Servo 45 moves the housing or casing of the gyro instrument inside its gimbal 23 to keep the axis 37 of the gyro instrument perpendicular to the spin axis of the rotor. Minor axis 36 of the rotor case is constructed at right angles to the spin axis of the rotor. With both axes 36 and 37 of the rotor case perpendicular to the spin axis of the gyro rotor, the plane of gimbal ring 35 is normal to the spin axis of the rotor. As the scanner sector scans or oscillates about its azimuth axis 21, whether inclined or not, the gimbal ring 35 oscillates in a plane perpendicular to the gyro spin axis and does not apply a force to the gyro rotor that would cause the gyro to precess. If the plane of ring 35 were not perpendicular to the spin axis of the gyro, the same would precess responsive to accelerating forces exerted through the respective parts of the instrument. With sector scanning, although equal amounts of precession in the gyro occur at opposite ends of the sector, the same does not cancel out as the scanner is pointed in different directions at the respective ends of the sector.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio scanning apparatus, an antenna, a frame by which said antenna is mounted to move about respective vertical and horizontal axes, a gimbal mounted on said frame to move about an axis parallel to the horizontal axis of said antenna, a gyro vertical having a housing pivotally mounted on said first gimbal to move about an axis normal to the axis of the first gimbal and including a second gimbal movable about a naxis normal to the axis of the housing and a rotor case movable about an axis normally coincident with the axis of the housing, and parallel motion means connecting said first gimbal and said antenna about the respective parallel axes thereof.

2. In a radio scanning apparatus, an antenna, a frame by which said antenna is mounted to move about respective vertical and horizontal axes, a gimbal mounted on said frame to move about an axis parallel to the horizontal axis of said antenna, a gyro vertical having a housing pivotally mounted on said gimbal to move about an axis normal to the axis of the gimbal and including a gimbal supported rotor case with its minor axis normally coincident with the axis of the housing having a rotor spinning about an axis normally coincident with the vertical axis of said antenna, and a parallel motion mechanism linking said gimbal and said antenna about the respective parallel axes thereof.

3. In a radio scanning apparatus, an antenna, a frame by which said antenna is mounted to move about respective vertical and horizontal axes, a gimbal mounted on said frame to move about an axis parallel to the horizontal axis of said antenna, a gyro vertical including a housing pivotally mounted on said gimbal to move about an axis normal to the axis of the gimbal, said housing having a rotor case universally mounted therein for movement about mutually perpendicular major and minor axes, with the major axis of the case being normally coincident with the axis of the gimbal and the minor axis of the case being normally coincident with the axis of the housing of the gyro vertical, and a parallel motion linkage connecting said gimbal and said antenna about the respective parallel axes thereof.

4. In a radio scanning apparatus, an antenna, a frame by which said antenna is mounted to move about mutually perpendicular spin and nod axes, a gimbal mounted on said frame to move about an axis parallel to the nod axis of said antenna, a gyro vertical having a housing pivotally mounted on said gimbal to move about a normally horizontal axis perpendicular to the axis of the gimbal and including a second gimbal movable about an axis normal to the axis of the housing and a rotor case movable about an axis normally coincident with the axis of the housing, and parallel motion means connecting said first gimbal and said antenna about the respective parallel axes thereof.

5. In a radio scanning apparatus, an antenna, a frame by which said antenna is mounted to move about mutually perpendicular spin and nod axes, a gimbal mounted on said frame to move about an axis parallel to the nod axis of said antenna, a gyro vertical having a housing pivotally mounted on said gimbal to move about a normally horizontal axis perpendicular to the axis of the gimbal and including a gimbal supported rotor case with its minor axis normally coincident with the axis of the housing having a rotor spinning about an axis normally coincident with the spin axis of the antenna, and a parallel motion mechanism linking said gimbal and said antenna about the respective parallel axes thereof.

6. In a radio scanning apparatus, an antenna, a frame by which said antenna is mounted to move about mutually perpendicular spin and nod axes, a gimbal mounted on said frame to move about an axis parallel to the nod axis of said antenna, a gyro vertical including a housing pivotally mounted on said gimbal to move about a normally horizontal axis perpendicular to the axis of the gimbal, said housing having a rotor case universally mounted therein for movement about mutually perpendicular major and minor axes, with the major axis of the case being normally coincident with the axis of the gimbal and the minor axis of the case being normally coincident with the axis of the housing of the gyro vertical, and a parallel motion linkage connecting said gimbal and said antenna about the respective parallel axes thereof.

7. A gyro controlled radio scanner having antenna means movable about vertical and horizontal axes, means for controlling said antenna means about its horizontal axis comprising a gimbal movable about an axis parallel to the horizontal axis of the antenna, a gyro vertical having a housing mounted on said gimbal to move about an axis perpendicular to the gimbal axis, a universally supported rotor case in said housing having its major axis normally coincident with the axis of the gimbal and its minor axis normally coincident with the axis of the housing, a pickoff detecting tilt of the housing about the minor axis of the rotor case, means responsive to the output of said pickoff for moving said gimbal and housing to restore the casing to a tilt free condition, and means driven by the moving means for correspondingly moving said antenna about its horizontal axis.

8. A gyro controlled radio scanner having antenna means movable about mutually perpendicular spin and nod axes, means for controlling said antenna means about its nod axis comprising a gimbal movable about an axis parallel to the nod axis of the antenna means, a gyro vertical having a housing mounted on said gimbal to move about an axis perpendicular to the gimbal axis, a universally supported rotor case in said housing having its major axis normally coincident with the axis of the gimbal and its minor axis normally coincident with the axis of the housing, a pickoff detecting tilt of the housing about the minor axis of the rotor case, means responsive to the output of said pickoff for moving said gimbal and housing to restore the casing to a tilt free condition, and a parallel motion linkage connecting the gimbal and antenna for simultaneously positioning said antenna about its nod axis.

9. The combination in a radio scanner of, an antenna, a frame by which said antenna is mounted to move about respective vertical and horizontal axes, a gimbal mounted on said frame to move about an axis parallel to the horizontal axis of said antenna, a gyro vertical having a housing mounted on said gimbal to move about a horizontal axis perpendicular to the gimbal axis, a universally supported rotor case in said housing having a rotor spinning about an axis normally coincident with the vertical axis of the antenna, said rotor case being supported to move about two mutually perpendicular normally horizontal axes, the major axis of which is normally coincident with the axis of the gimbal and the minor axis of which is normally coincident with the axis of the housing, a pickoff for detecting tilt of the casing about the minor axis of the rotor case, means carried by said gimbal responsive to the output of said pickoff for moving said housing to restore the casing to a tilt-free condition about the minor axis of the rotor case.

10. The combination in a radio scanner of, an antenna, a frame by which said antenna is mounted to move about mutually perpendicular spin and nod axes, a gimbal mounted on said frame to move about an axis parallel to the nod axis of said antenna, a gyro vertical having a housing mounted on said gimbal to move about an axis perpendicular to the gimbal axis, a universally supported rotor case in said housing having a rotor spinning about an axis normally coincident with the spin axis of the antenna, said rotor case being supported to move about two mutually perpendicular axes, the major axis of which is normally coincident with the axis of the gimbal and the minor axis of which is normally coincident with the axis of the housing, a pickoff for detecting tilt of the housing about the minor axis of the universally supported rotor case, and means carried by said gimbal responsive to the output of said pickoff for moving said housing to restore the housing to a tilt-free condition.

11. The combination of a frame having a gimbal mounted thereon to move about a horizontal axis, a gyro vertical having a housing mounted on said gimbal to move about a horizontal axis perpendicular to the gimbal axis, a rotor case mounted in said housing to move about two mutually perpendicular normally horizontal axes, the major axis of which is normally coincident with the axis of the gimbal and the minor axis of which is normally coincident with the axis of the housing, a pickoff for detecting tilt of the housing relative to the rotor case about the minor axis thereof, and means mounted on said gimbal responsive to the output of said pickoff for moving said housing to restore the casing to a tilt-free condition.

ROBERT F. HAYS, Jr.

REFERENCES CITED

The following references are of record in the file of this patent:

UNITED STATES PATENTS

| Number | Name | Date |
|---|---|---|
| 2,127,415 | Marigue | Aug. 16, 1938 |
| 2,369,622 | Toulon | Feb. 13, 1945 |
| 2,411,472 | Slobod | Nov. 19, 1946 |
| 2,418,465 | Doba | Apr. 8, 1947 |